(12) United States Patent
Steben et al.

(10) Patent No.: US 12,408,049 B2
(45) Date of Patent: Sep. 2, 2025

(54) SYSTEMS AND METHODS FOR PREMIUM SESSION RETAINABILITY IN CORE NETWORKS

(71) Applicant: Verizon Patent and Licensing Inc., Basking Ridge, NJ (US)

(72) Inventors: Jerry Steben, Fort Worth, TX (US); Emerando M. Delos Reyes, Pleasant Hill, CA (US); Matthew W. Nelson, Pleasanton, CA (US); Raymond WaiMan So, San Ramon, CA (US); Shanthala Kuravangi-Thammaiah, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 561 days.

(21) Appl. No.: 17/830,466

(22) Filed: Jun. 2, 2022

(65) Prior Publication Data
US 2023/0397021 A1  Dec. 7, 2023

(51) Int. Cl.
*H04W 24/04* (2009.01)
*H04L 41/0806* (2022.01)
*H04L 67/1095* (2022.01)

(52) U.S. Cl.
CPC ......... *H04W 24/04* (2013.01); *H04L 41/0806* (2013.01); *H04L 67/1095* (2013.01)

(58) Field of Classification Search
CPC .. H04W 24/04; H04W 76/22; H04L 41/0806; H04L 67/1095; H04L 41/0894; H04L 41/40
See application file for complete search history.

(56) References Cited

U.S. PATENT DOCUMENTS

| 2021/0185601 A1* | 6/2021 | Altay | H04W 28/24 |
| 2022/0408320 A1* | 12/2022 | Zhu | H04W 36/0016 |
| 2024/0007925 A1* | 1/2024 | Li | H04W 40/02 |

* cited by examiner

*Primary Examiner* — Jae Y Lee
*Assistant Examiner* — Nam P. Cao (57) ABSTRACT

Systems and methods described herein enable premium session retainability for differentiation of services with respect to network function failures. A first network function of a core network obtains a session retention indicator during establishment of a protocol data unit (PDU) session. The first network function calculates a compute footprint for the first network function to support the PDU session and any other premium sessions currently serviced by the first network function. An orchestration device receives the compute footprint and provisions a second network function based on the compute footprint. The first network function and the second network function perform data replication of state information for the PDU session to allow premium sessions to continue with no or minimal interruption in the event of a failover scenario.

20 Claims, 8 Drawing Sheets

SYSTEMS AND METHODS FOR PREMIUM SESSION RETAINABILITY IN CORE NETWORKS

BACKGROUND

Fourth Generation (4G) and Fifth Generation (5G) mobile networks may include a core network that supports and manages radio access networks (RANs), providing various services and enabling connections to other networks (e.g., connections to the Internet, etc.). Different types of services in core networks may be implemented using virtual network architectures that enables multiple network functions to be implemented on top of a common shared physical infrastructure using software defined networking (SDN) and/or network function virtualization (NFV).

DETAILED DESCRIPTION OF EXAMPLE EMBODIMENTS

The following detailed description refers to the accompanying drawings. The same reference numbers in different drawings may identify the same or similar elements.

Telecommunications service providers may offer different service levels and features to subscribers. One such offered featured is referred to herein as "session retainability" and/or "premium session retainability," which may be defined as the ability for a session to be maintained during a network function (NF) failure with minimal negative effects to the session. In contrast, an NF failover with basic or non-premium session retainability, may result in a session being lost and a subscriber device needing to re-establish the session.

4G and 5G Network Functions (NFs) may support inter-chassis redundancy deployment, which ensures that an NF is available if one NF instance become unavailable. With inter-chassis redundancy, if a primary NF fails, a secondary NF on a different network device may assume the functions of the primary NF. Inter-chassis redundancy provides mechanisms for Protocol Data Unit (PDU) session state replication across N-many redundant NF instances (where N-many can be defined by operator deployment specifications).

Currently, telecommunications service providers do not allow for heterogeneous mixing of premium session retainability and non-premium session retainability service in an NF, which can increase the overall NF cost. Furthermore, not every subscriber has a need for premium session retainability, as some customers may accept having to reestablish a session in the event of an NF failure (e.g., as a tradeoff for a lower subscription rate).

Systems and methods described herein enable premium session retainability for differentiation of services with respect to network function failures. A provisioning system may enable subscriptions with premium session retainability, which may be indicated within a subscriber profile. Upon session creation, an NF (e.g., a Session Management Function (SMF), Policy Charging Function (PCF), etc.) will parse the provisioned premium session retainability feature from the stored profile. The NF may calculate the subscriber "footprint" in terms of compute resources for the PDU session. Each of the NFs SMF, PCF, etc.) may provide feedback to a Service Orchestrator for the combined compute footprint for all the premium sessions (e.g., with subscriptions for premium session retainability) the NF currently is serving. This compute footprint may represent a minimum amount of redundant compute resources needed to survive a total NF failure. The orchestrator may provision redundant NFs to support at least the minimum compute footprint for each NF. If failover occurs (e.g., due to failure of a primary NF), all non-premium subscribers would need to reestablish sessions, while the premium subscribers' sessions would continue with no or minimal interruption.

According to an implementation, a first NF of a core network obtains a premium session retention indicator during establishment of a protocol data unit (PDU) session. The first NF calculates a compute footprint for the first NF to support a premium session and any other premium sessions currently serviced by the first NF. An orchestration device receives the compute footprint and provisions a second NF based on the compute footprint. The first NF and the second NF perform data replication of state information for the PDU session to allow premium sessions to continue with no or minimal interruption in the event of a failover scenario.

Use of subscriptions with a premium session retention indicator (e.g., referred to herein as a "PremRetFlag") allows for a differentiation of services with respect to NF failures. Enabling premium session retainability may allow a network operator to deploy different failover domains for differentiated retainability (e.g., with more robust scenarios for premium retainability).

Figure 1:
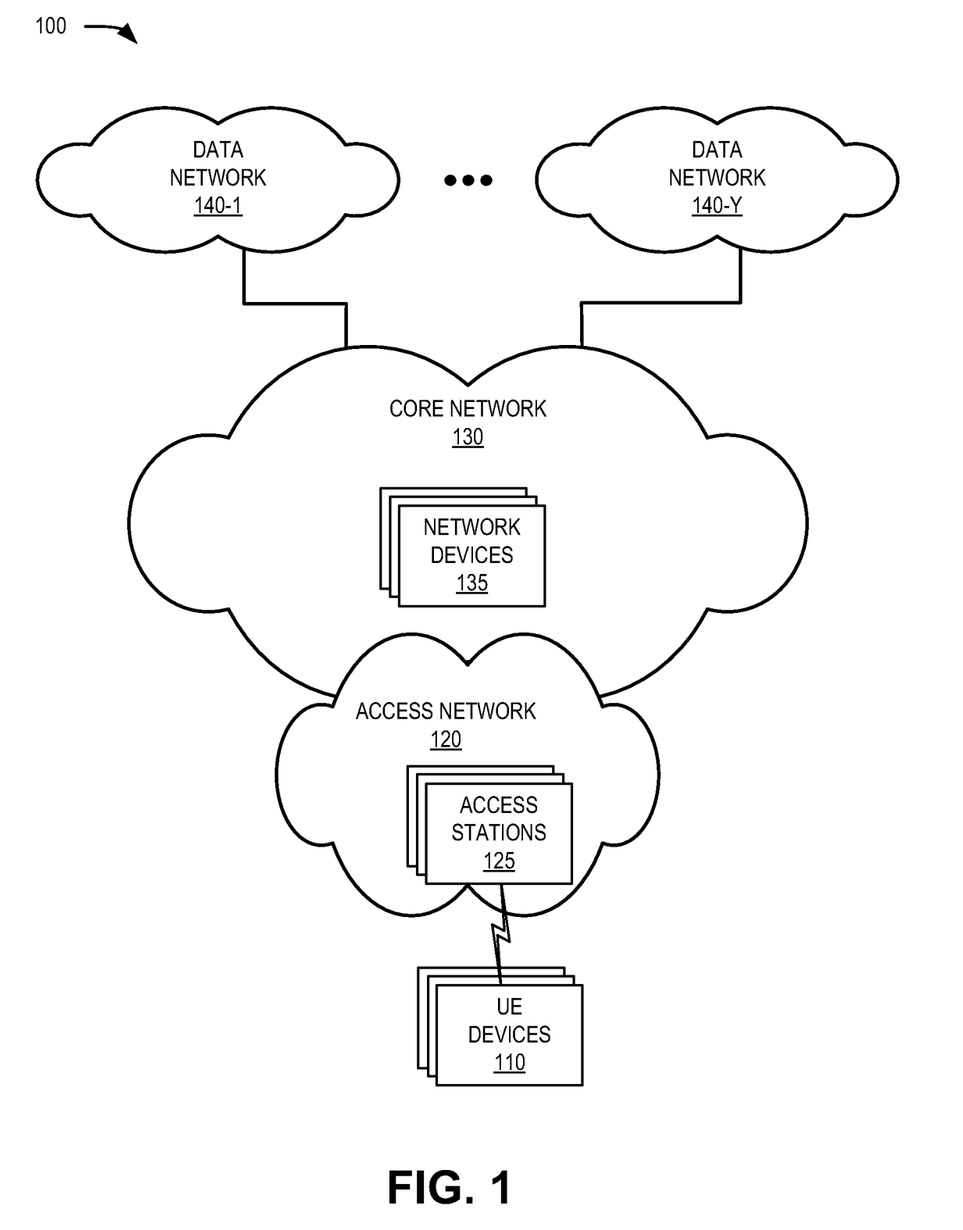
FIG. 1 is a diagram of an example environment in which the systems and/or methods described herein may be implemented.

FIG. 1 is a diagram of an example environment 100 in which the systems and/or methods described herein may be implemented. As shown in FIG. 1, environment 100 may include UE devices 110, a radio access network (RAN) 120 that includes access stations 125, a core network 130 that includes network devices 135, and data networks (DNs) 140-1 to 140-Y (referred to herein collectively as "DNs 140" and individually as "DN 140").

UE device 110 may include a device with cellular wireless communication functionality. For example, UE device 110 may include a handheld wireless communication device (e.g., a smart phone, etc.), a wearable computer device (e.g., a wristwatch computer device, etc.), a computer; a WiFi access point, a portable gaming system, an Internet-of-Things device, a fixed wireless access (FWA) station, and/or any other type of computer device with wireless communication capabilities. UE device 110 may include capabilities for voice communication, mobile broadband services (e.g., video streaming, real-time gaming, premium Internet access etc.), best effort data traffic, and/or other types of applications. UE device 110 may be associated with a subscriber/account for using services of access network 120 and/or core network 130.

Access network 120 may enable UE devices 110 to connect to core network 130 via access stations 125 using cellular wireless signals. Access station 125 may include, for example, a 5G New Radio (NR) base station (e.g., a gNodeB) and/or a Fourth Generation (4G) Long Term Evolution (LTE) base station (e.g., an eNodeB). Each access station 125 may include devices and/or components configured to enable cellular wireless communication with UE devices 110. For example, access station 125 may include a radio frequency (RF) transceiver configured to communicate with UE devices using a 5G NR air interface, a 4G LTE air interface, and/or using another type of cellular air interface. Access station 125 may enable communication with core network 130, to allow, for example, authenticating UE device 110 or monitoring network activity of UE device 110. According to one implementation, access network 120 may include a non-standalone (NSA) network to support dual coverage using 4G and 5G networks. In another implementation, access network 120 may include a 5G standalone (SA) network.

Core network 130 may be managed by a telecommunications service provider (e.g., including cellular wireless communication services) and may manage communication sessions of subscribers connecting to core network 130 via access network 120. Core network 130 may include one or multiple networks of different types and technologies. For example, core network 130 may be implemented to include a next generation core (NGC) network for a 5G network, an Evolved Packet Core (EPC) of an LTE network, an LTE-A network, an LTE-A Pro network, another type of 4G core network, and/or a legacy core network.

Core network 130 may include various network devices 135. Depending on the implementation, network devices 135 may include 5G core network components (e.g., a User Plane Function (UPF), an Access and Mobility Management Function (AMF), a Session Management Function (SMF), a Unified Data Management (UDM) function, a Policy Control Function (PCF), a Unified Data Repository (UDR), a Charging Function (CHF), etc.), 4G core network components (e.g., a Serving Gateway (SGW), a Packet data network Gateway (PGW), a Mobility Management Entity (MME), a Home Subscriber Server (HSS), a Policy Charging and Rules Function (PCRF) etc.), or another type of core network components (e.g., future 6G network components). In other implementation, network devices 135 may include combined 4G and 5G functionality, such as a session management function with PGW-control plane (SMF+PGW-C) and a user plane function with PGW-user plane (UPF+PGW-U).

Network device 135 may include a physical function node or a virtual network function (VNF). Thus, the components of core network 130 may be implemented as dedicated hardware components and/or as VNFs implemented on top of a commonly shared physical infrastructure using Software Defined Networking (SDN). The shared physical infrastructure may be implemented using one or more devices 600 described below with reference to FIG. 6 in a distributed computing center associated with core network 130. Additionally, or alternatively, some, or all, of the shared physical infrastructure may be implemented using one or more devices 600. According to an implementation, some network functions executed on network devices 135 may be regionally or geographically separated and replicate and/or synchronize data with a other network functions to provide inter-chassis redundancy.

DNs 140 may each include a data network, such as a packet data network. A particular DN 140 may be associated with an Access Point Name (APN) and UE device 110 may request a connection to the particular packet data network 140 using the APN. DN 140 may include, and/or be connected to, and enable communication with, a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks.

Although FIG. 1 shows example components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
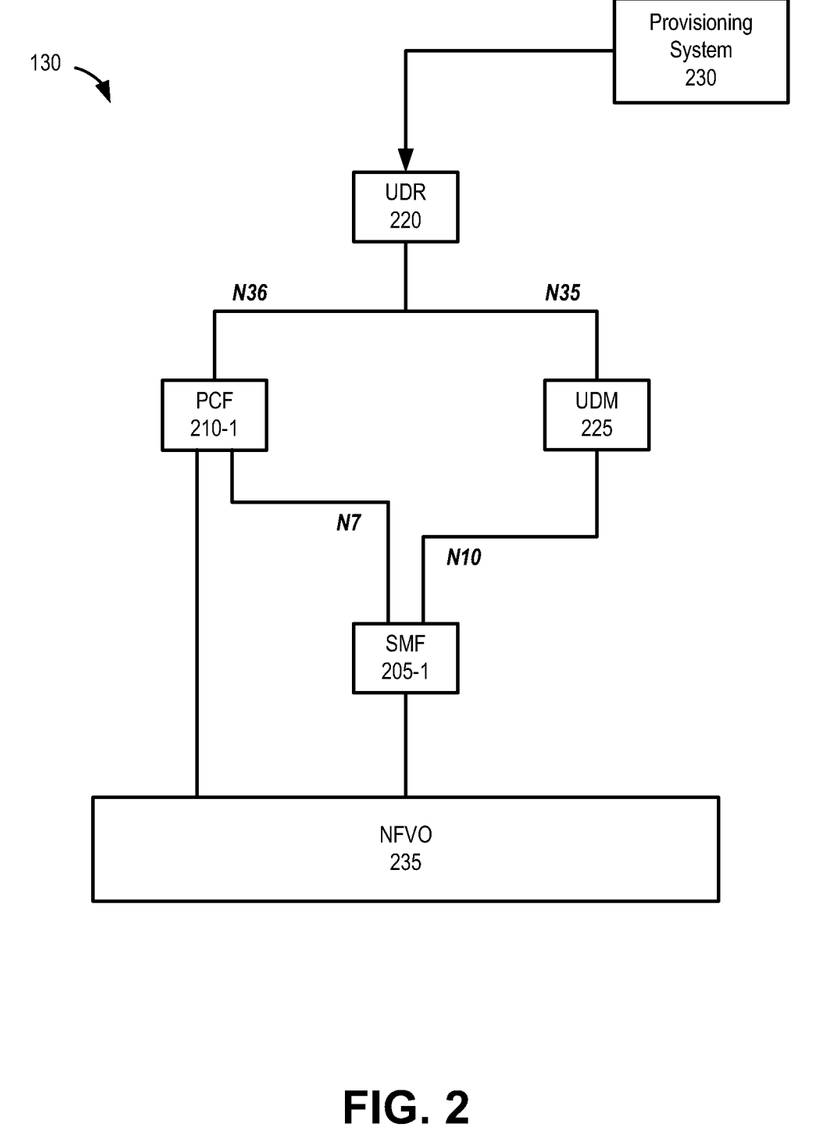
FIG. 2 is a diagram illustrating example elements of core network in a 5G system, according to an implementation described herein.

FIG. 2 is a diagram illustrating example elements of core network 130 in a 5G system, according to an implementation described herein. As shown in FIG. 2, core network 130 may include a SMF 205-1, a PCF 210-1, a UDR 220, a UDM function 225, a provisioning system 230, and a Network Function Virtualization Orchestrator (NFVO) 235. Core network 130 may include other components that are not illustrated for simplicity.

The components depicted in FIG. 2 may correspond to one or more of network devices 135 and may be implemented as dedicated hardware components or as virtualized functions implemented on top of a common shared physical infrastructure using SDN. For example, an SDN controller may implement one or more of the components of FIG. 2 using an adapter implementing a VNF virtual machine (VM), an event driven serverless architecture interface, and/or another type of SDN architecture. The common shared physical infrastructure may be implemented using one or more devices 600 described below with reference to FIG. 6 in a distributed computing center associated with core network 130.

SMF 205 may perform session establishment, session modification, and/or session release, perform IP address allocation and management, perform Dynamic Host Configuration Protocol (DHCP) functions, perform selection and control of a UPF (not shown), configure traffic steering at the UPF to guide the traffic to the correct destinations, terminate interfaces toward PCF 210, perform lawful intercepts, charge data collection, support charging interfaces, control and coordinate of charging data collection, terminate session management parts of Non-Access Stratum (NAS) messages, perform downlink data notification, manage roaming functionality, and/or perform other types of control plane processes for managing user plane data.

According to implementations described herein, to set up premium session retainability, SMF 205-1 may be configured to (a) receive a PremRetFlag as part of a PDU session establishment, (b) provide the PremRetFlag to PCF 210-1, (c) calculate a compute footprint for SMF 205-1 to support its current PDU sessions, and (d) forward a calculated footprint to an orchestrator (e.g., NFVO 235) to set up inter-chassis redundancy for SMF 205-1. For example, SMF 205-1 may be configured to receive the PremRetFlag from UDM 225 over a modified N10 interface and to provide the PremRetFlag to PCF 210-1 via a modified N7 interface. Furthermore, SMF 205-1 may be configured to identify Quality of Service (QoS) and/or Service Level Agreement (SLA) requirements for a requested PDU session and calculate an amount of compute resources (e.g., memory, processing, containers, VMs, etc.) needed to support the total number of PDU session that require inter-chassis redundancy. That is, the calculated footprint may represent the combined resources SMF 205-1 would need to survive a total NF failure for all the premium subscribers that SMF 205-1 is currently serving. SMF 205-1 may be further configured to send the calculated compute resources to NFVO 235.

PCF 210-1 may support policies to control network behavior, provide policy rules to control plane functions (e.g., to SMF 205-1), access subscription information relevant to policy decisions, perform policy decisions, and/or perform other types of processes associated with policy enforcement. According to implementations described herein, PCF 210-1 may be configured to subscribe to UDR services, for example, to receive premium session retainability indicators and update notifications from UDR 220. PCF 210-1 may also be configured to receive a PremRetFlag from SMF 205-1 over a modified N7 interface. Additionally, or alternatively, PCF 210-1 may be configured to receive policy data with a PremRetFlag from UDR 220 or confirm the PremRetFlag with UDR 220 using a modified N36 interface. Similar to SMF 205-1 described above, PCF 210-1 may calculate a subscriber footprint for PCF 210-1 to support the PDU session and forward a calculated footprint to an orchestrator (e.g., NFVO 235) to initiate instantiation of inter-chassis redundancy for PCF 210-1.

UDR 220 may provide a unified data structure that is accessible to a number of functional elements in core network 130. For example, UDR 220 may support storage and retrieval of subscription data by UDM 225 and storage and retrieval of policy data by PCF 210, among others. According to implementations described herein, UDR 220 may store a subscriber profile that includes a premium session retention indicator (e.g., a "PremRetFlag") to indicate that sessions for the subscriber are to be configured for premium session retention. According to one implementation, UDR 220 may provide the PremRetFlag to network functions during PDU session creation or to network functions subscribed to UDR services, such as PCF 210 and UDM 225. Additionally, UDR 220 may receive updates to subscriber data (e.g., including adding/removing a PremRetFlag) and may notify PCF 210 and UDM 225 of such updates.

UDM 225 may maintain subscription information for UE devices 110, manage subscriptions, generate authentication credentials, handle user identification, perform access authorization based on subscription data, perform NF registration management, maintain service and/or session continuity by maintaining assignment of SMF 205 for ongoing sessions, support SMS delivery, support lawful intercept functionality, and/or perform other processes associated with managing user data. According to an implementation, UDM 225 may be configured to receive subscription data with a PremRetFlag from UDR 220 over a modified N35 interface and provide SMF data, including the PremRetFlag to SFM 205-1 over a modified N10 interface.

Provisioning system 230 may include a network device that performs subscriber provisioning of profiles stored in UDR 220. The subscriber provisioning may provide, for example, access management (AM) subscription data, session management (SM) subscription data, and short message service (SMS) subscription data (referred to collectively as "subscription data"), policy data, structured data for exposure, and application data. According to implementations described herein, provisioning may include setting a PremRetFlag in the subscriber profile to indicate a subscription for premium session retainability. UDR 220 may receive and store the PremRetFlag in the subscriber profile.

NFVO 235 may be part of an NF management platform for core network 130. NFVO 235 may create, remove, and/or update VNFs, such as virtualized versions of 5G core network 130 components (e.g., SMF 205, PCF 210, UPF, AMF, etc.). In one implementation, NFVO 235 may be configured to receive calculated footprints of compute resources required to support inter-chassis redundancy for SMF 205-1, PCF 210-1, and/or other NFs (e.g., a Charging Function (CHF), not shown). NFVO 235 may be further configured to orchestrate placement and instantiation of redundant network functions to support premium sessior nobility based on the calculated footprints.

Figure 3:
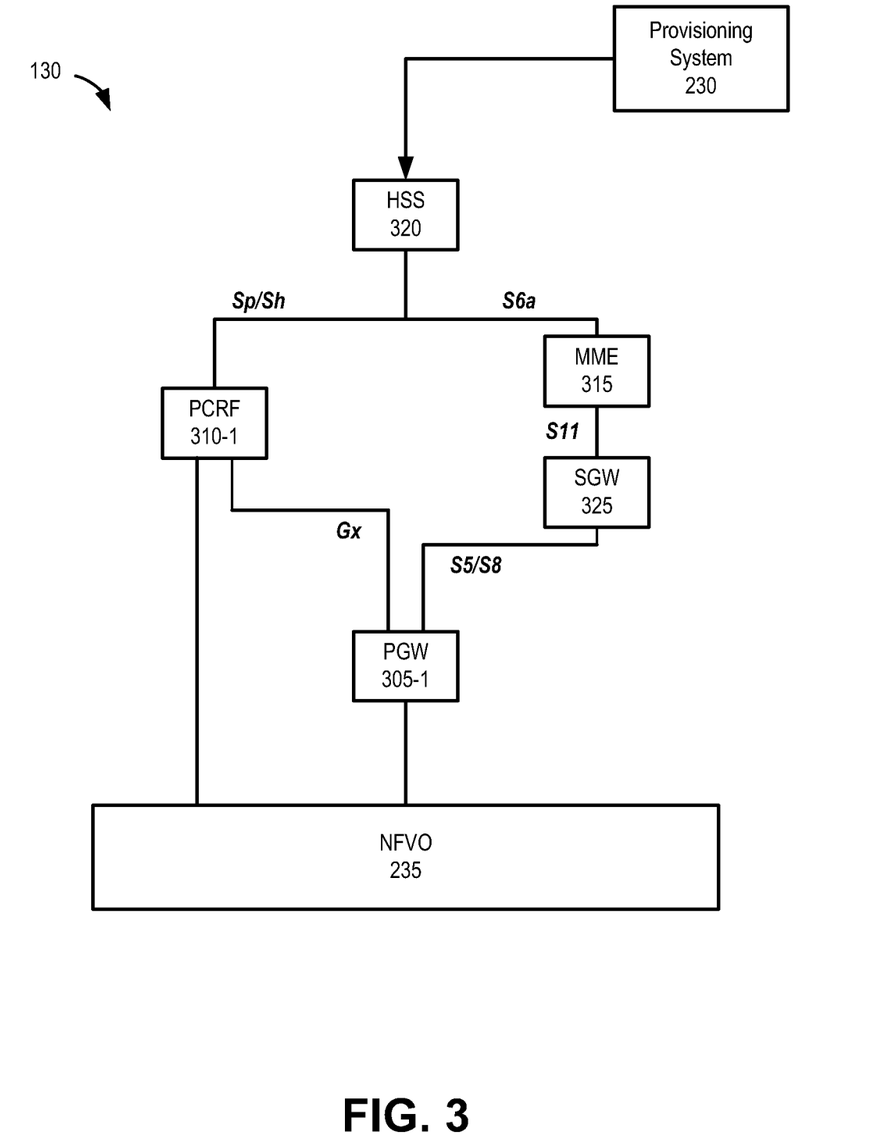
FIG. 3 is a diagram illustrating example elements of core network in a 4G system, according to an implementation described herein.

FIG. 3 is a diagram illustrating example elements of core network 130 in a 4G system, according to an implementation described herein. As shown in FIG. 3, core network 130 may include a PCRF 310-1, an MME 315, an HSS 320, a SGW 325, a PGW 305-1, provisioning system 230, and NFVO 235. Core network 130 may include other components that are not illustrated for simplicity.

The components depicted in FIG. 3 may correspond to one or more of network devices 135 and may be implemented as dedicated hardware components or as virtualized functions implemented on top of a common shared physical infrastructure using SDN. For example, an SDN controller may implement one or more of the components of FIG. 3 using an adapter implementing a VNF virtual machine, an event driven serverless architecture interface, and/or another type of SDN architecture. The common shared physical infrastructure may be implemented using one or more devices 600 described below with reference to FIG. 6 in a distributed computing center associated with core network 130.

PGW 305 may function as a gateway to a data network 140. A particular UE device 110, while connected to a single SGW 325, may be connected to multiple PGWs 305, one for each data network 140 with which UE device 110 communicates. For example, a particular PGW 305 may be associated with a particular APN and UE device 110 may connect to the particular APN by connecting to the PGW 305 associated with the particular APN. Thus, UE device 110 may be connected to one or more APNs at a particular time.

According to implementations described herein, to set up premium session retainability, PGW 305-1 may be configured to (a) receive a PremRetFlag as part of a PDU session establishment, (b) provide the PremRetFlag to PCRF 310-1, (c) calculate a compute footprint for PGW 305-1 to support its current PDU sessions, and (d) forward a calculated footprint to an orchestrator (e.g., NFVO 235) to set up inter-chassis redundancy for PGW 305-1. For example, PGW 305-1 may be configured to receive the PremRetFlag from SGW 325 over a modified S5/S8 interface and to provide the PremRetFlag to PCRF 310-1 via a modified Gx interface. Furthermore, PGW 305-1 may be configured to identify QoS and/or SLA requirements for a requested PDU session and calculate an amount of compute resources (e.g., memory, processing, containers, VMs, etc.) needed to support the total number of PDU session that require inter-chassis redundancy. That is, the calculated footprint may represent the combined resources PGW 305-1 would need to survive a total NF failure for all the premium subscribers that PGW 305-1 is currently serving. PGW 305-1 may be further configured to send the calculated compute resources to NFVO 235.

PCRF 310-1 may implement policy and charging rules functions, such as establishing QoS requirements, setting allowed bandwidth and/or data throughput limits for particular bearers and/or UE devices 110, determining charges for a particular service for a UE device 110, and/or other types of policy or charging rules. PCRF 310-1 may also be configured to receive a PremRetFlag from PGW 305-1 over a modified Gx interface. The Gx interface 262 may be implemented, for example, using Diameter protocol. Additionally, or alternatively, PCRF 310-1 may be configured to receive policy data with a PremRetFlag from HSS 320 or confirm a received PremRetFlag with HSS 320 using a modified Sp/Sh interface. Similar to PGW 305-1 described above, PCRF 310-1 may calculate a compute footprint for PCRF 310-1 to support its current sessions and forward a calculated footprint to an orchestrator (e.g., NFVO 235) to initiate instantiation of inter-chassis redundancy for PCRF 310-1.

MME 315 may implement control plane processing for core network 130. For example, MME 315 may manage the mobility of UE device 110, implement tracking and paging procedures, activate and deactivate bearers, authenticate a user of UE device 110, and/or interface to non-LTE radio access networks. A bearer may represent a logical channel with particular QoS requirements. MME 315 may also select a particular SGW 325 for a particular UE device 110. MME 315 may communicate with SGW 325 through an S11 interface. The S11 interface may be implemented, for example, using GTPv2. According to a implementation, the S11 interface may be used to forward a PremRetFlag to SGW 325 when creating and/or managing a new session for a particular UE device 110.

HSS 320 may store subscription information associated with UE devices 110 and/or information associated with users of UE devices 110. For example, HSS 320 may store subscriber profiles that include authentication, access, and/or authorization information. Each subscriber profile may include information identifying UE device 110, authentication and/or authorization information for UE device 110, services enabled and/or authorized for UE device 110, device group membership information for UE device 110, and/or other types of information associated with UE device 110. According to implementations described herein, the subscriber profile may include a premium session retention indicator (e.g., a "PremRetFlag") that identifies whether sessions for the subscriber are to be configured for premium session retention. HSS 320 may communicate with MME 250 through an S6a interface that is modified to support a PremRetFlag. The S6a interface may be implemented, for example, using a Diameter protocol. HSS 320 may communicate with PCRF device 260 using an Sp/Sh interface that is modified to support a PremRetFlag.

SGW 325 may provide an access point to and from UE device 110, may handle forwarding of data packets for UE device 110, and may act as a local anchor point during handover procedures between different access stations 125. According to an implementation, SGW 325 may interface with PGW 305 through a S5/S8 interface that is modified to support a PremRetFlag. The S5/S8 interface may be implemented, for example, using GTPv2.

Provisioning system 230 may include a network device that performs subscriber provisioning of profiles stored in HSS 320. According to implementations described herein, provisioning may include setting of a PremRetFlag in the subscriber profile to indicate a subscription for premium session retainability. HSS 320 may receive and store the PremRetFlag in the subscriber profile.

NFVO 235 may be part of an NF management platform for core network 130. NFVO 235 may create, remove, and/or update VNFs, such as virtualized versions of 4G core network 130 components (e.g., PGW 305, PCRF 310, SGW 325, MME 315, etc.). In one implementation, NFVO 235 may be configured to receive calculated footprints of compute resources required to support inter-chassis redundancy for PGW 305-1, PCRF 310-1, and/or other NFs. NFVO 235 may be further configured to orchestrate placement and instantiation of redundant network functions to support premium session retainability based on the calculated footprints.

Figure 4A:
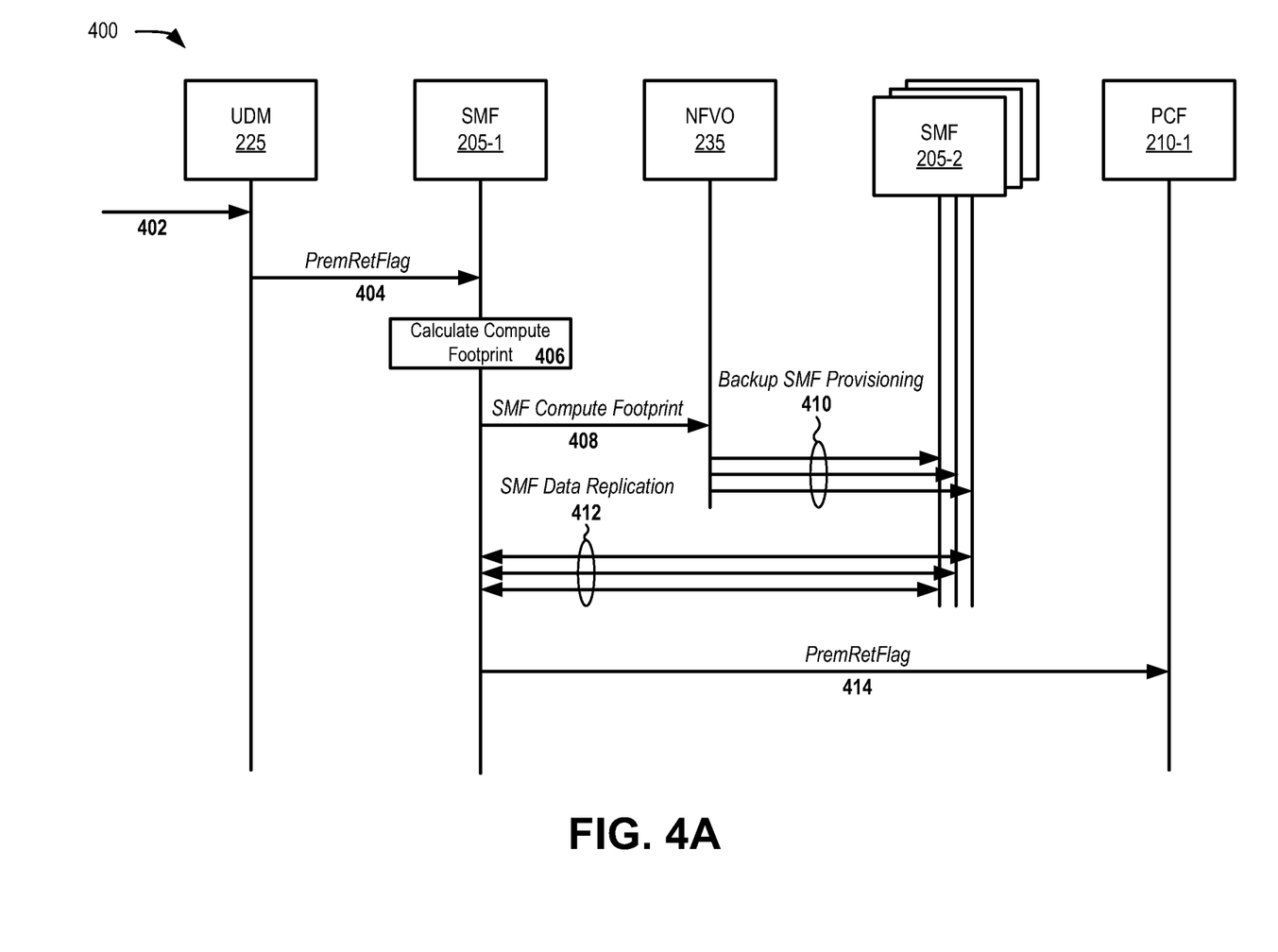
FIGS. 4A and 4B are diagrams illustrating example communications to provision premium session retainability, according to an implementation described herein.

FIG. 4A is a diagram illustrating example communications to provision premium session retainability for a session in a portion 400 of core network 130, according to an implementation described herein. More particularly, communications in FIG. 4A illustrate an embodiment of how inter-chassis redundancy can be configured for an SMF supporting a PDU session. As shown in FIG. 4A, network portion 400 may include SMFs 205-1 and 205-2, PCF 210-1, UDM 225, and NFVO 235. FIG. 4A provides simplified illustrations of communications in network portion 400 and is not intended to reflect every signal or communication exchanged between devices/functions.

Assume a user has purchased a subscription that includes "premium session retainability" and that a PremRetFlag has been included in the subscriber's profile (e.g., stored in UDR 220). As shown at reference 402, UDM 225 may retrieve the PremRetFlag along with other user profile data when a PDU session for the subscriber is being established. UDM 225 may pass 404 the PremRetFlag to SMF 205-1, which may be the primary SMF for the PDU session. SMF 205-1 may recognize the PremRetFlag and, in response, calculate the subscriber's additional compute footprint 406 (e.g., additional SMF resources required to support the PDU session with the other active premium sessions) for failovers. As shown at reference 408, SMF 205-1 may send to NFVO 235 the footprint data. NFVO 235 may receive the footprint data and, as shown at reference 410, may provision one or more backup SMFs 205-2 with the appropriate resource sizing to support inter-chassis redundancy for all sessions using SMF 205-1 with premium session retainability. Once provisioned, SMFs 205-1 and 205-2 may conduct data replication 412 for premium retainability subscribers. The data replication may ensure that SMF context/state information is distributed for each session among high availability (HA) local network devices and/or among network devices with geographic redundancy to support failover scenarios. As indicated at reference 414, during policy retrieval SMF 205-1 may convey the PremRetFlag to PCF 210-1.

Figure 4B:
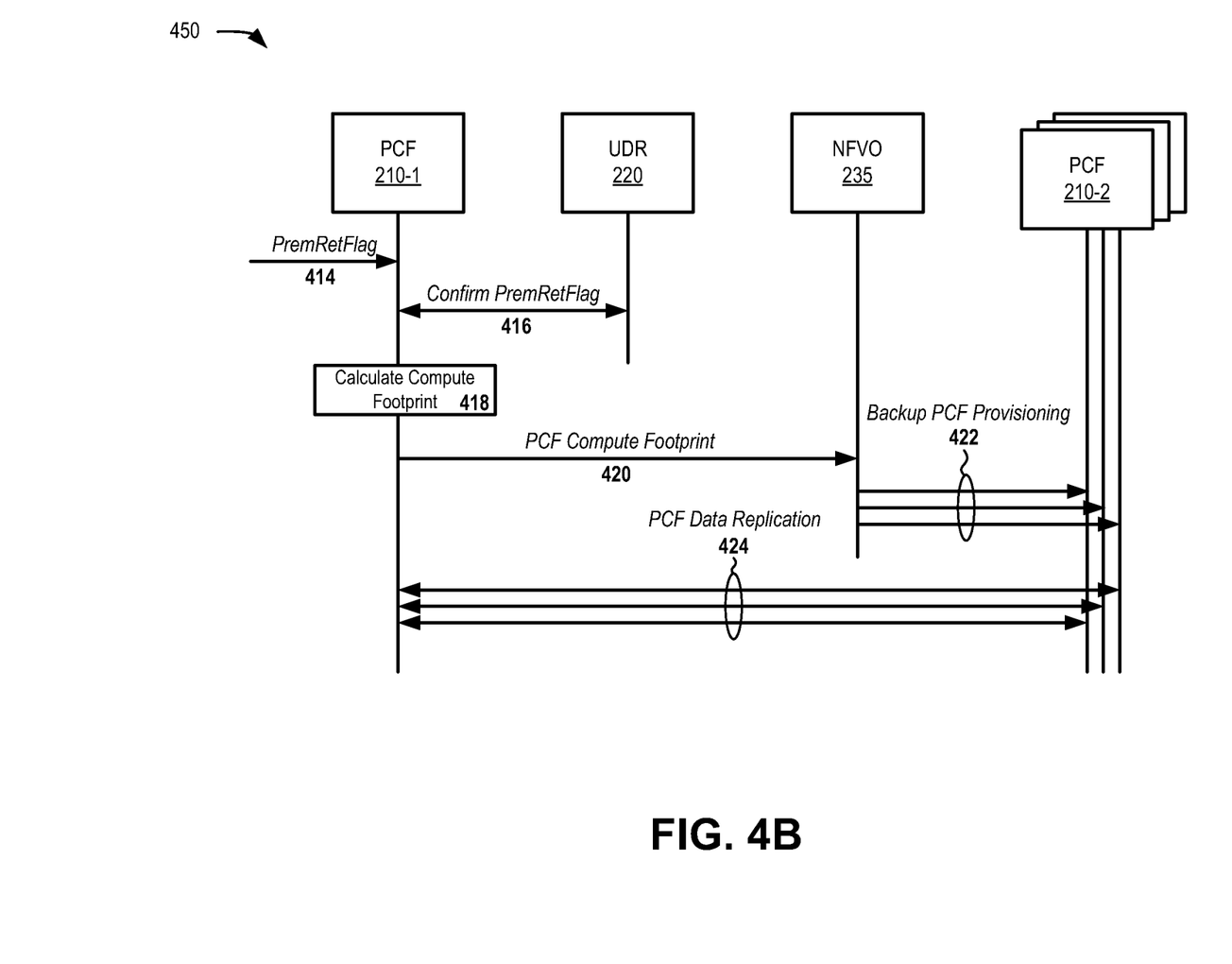

FIG. 4B is a diagram illustrating further example communications to provision premium session retainability for a session in a portion 450 Of core network 130, according to an implementation described herein. More particularly, communications in FIG. 4B illustrate an embodiment of how inter-chassis redundancy can be configured for a PCF supporting the PDU session of FIG. 4A. As shown in FIG. 4B, network portion 450 may include PCFs 210-1 and 210-2, UDR 220, and NFVO 235. FIG. 4B provides simplified illustrations of communications in network portion 450 and is not intended to reflect every signal or communication exchanged between devices/functions.

As shown at reference 414 of FIG. 4B, PCF 210-1 may receive a PremRetFlag (e.g., from SMF 205-1). As shown at reference 416, PCF 210-1 may check with UDR 220 to confirm the PremRetFlag for the session and, in response, calculate the subscriber's additional compute footprint 418 (e.g., additional PCF resources required to support the PDU session and the other existing premium sessions) for failovers. As shown at reference 420, PCF 210-1 may send to NFVO 235 the footprint data. NFVO 235 may receive the footprint data and, as shown at reference 422, may provision one or more backup PCF 210-2 with the appropriate resource sizing to support inter-chassis redundancy for all sessions using PCF 210-1 with premium session retainability. Once provisioned, PCFs 210-1 and 210-2 may conduct data replication 424 for premium retainability subscribers. The data replication may ensure that PCF context/state information is distributed for each session among HA local network devices and/or among network devices with geographic redundancy to support failover scenarios.

While FIGS. 4A and 4B illustrate an example of communications for provisioning premium session retainability in core network 130, in other implementations, different communications or communication sequences may be used. Furthermore, while FIGS. 4A and 4B illustrate 5G core network functions, in another implementation, similar communications may be used for 4G core network functions or combined 4G/5G network functions.

Figure 5:
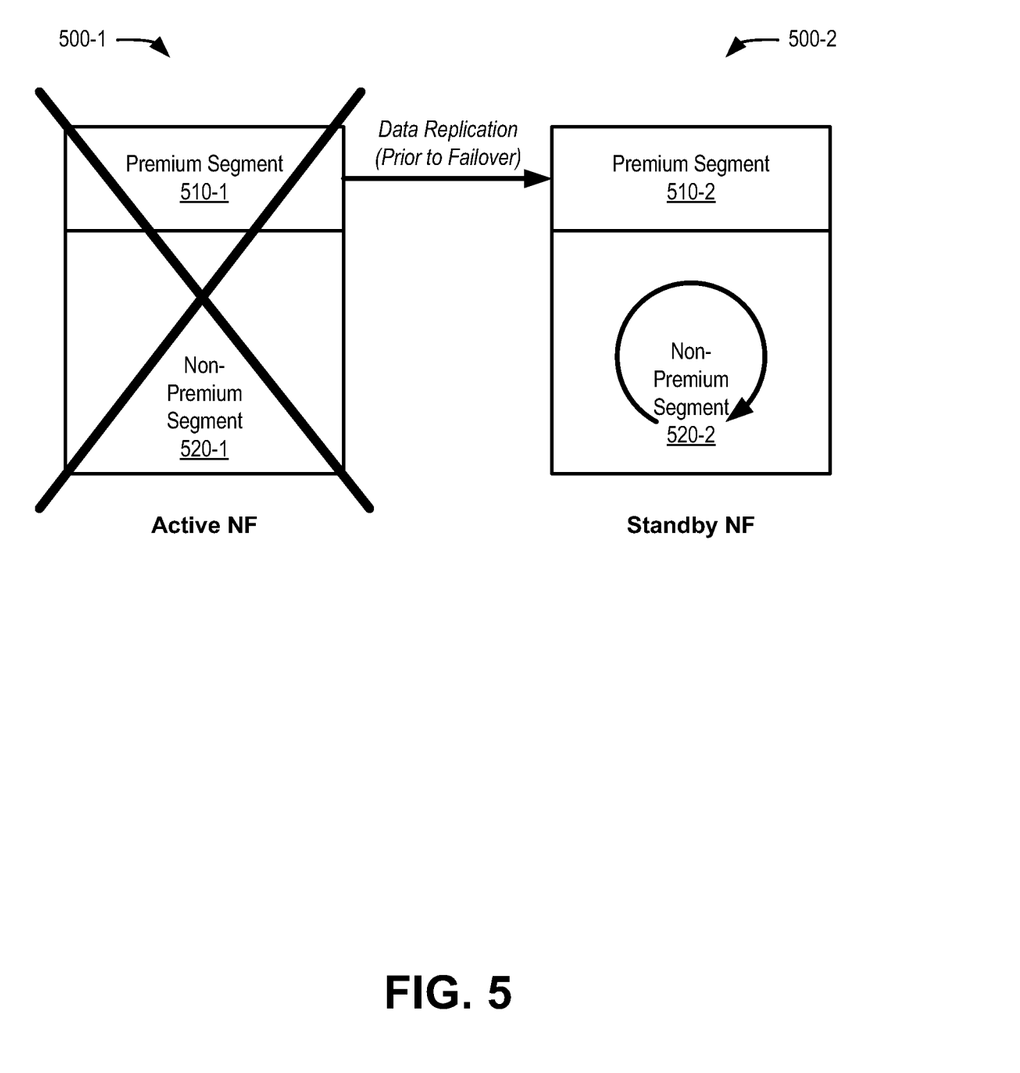
FIG. 5 is a diagram illustrating a behavior of a provisioned network function set during a failover, according to an implementation.

FIG. 5 is an illustration of behavior of a provisioned NF set 500-1/500-2 during a failover. NF set 500-1/500-2 may correspond to an inter-chassis redundancy configuration for an SMF (e.g., SMFs 205-1 and 205-2), a PCF (e.g., PCFs 210-1 and 210-2), a PGW (e.g., PGWs 305), a PCRF (e.g., PCRFs 310), for example. NF set 500-1/500-2 may include an active or primary NF chassis (e.g., NF 500-1) and an inactive or standby NF chassis (e.g., NF 500-2).

In the configuration of FIG. 5, each NF 500 may include a premium segment 510 and a non-premium segment 520. Premium segment 510 may be configured to support at least the compute footprint (e.g., SMF compute footprint 408, PCF compute footprint 420, etc.) for current premium PDU sessions of active NF 500-1. For example, assuming premium segment 510-1 requires 25 vCPU (virtual central processing units) and 1GB RAM (random access memory) to support current PDU sessions, premium segment 510-2 may be configured with at least 25 vCPU and 1GB RAM. Premium segment 510-1 and premium segment 510-2 may perform data replication on a continual real-time basis to provide PDU session context up to the time of a failure of active NF 500-1. Premium segments 510-1 and 510-2 may use any technique to replicate sessions across NF geo-redundancy pairings.

Non-premium segment 520-1 and non-premium segment 520-2 may be allocated a portion of remaining resources from NFs 500-1 and 500-2. Non-premium segments 520 do not replicate or exchange context/state data for PDU sessions. Each NF 500 may thus service a combination of premium sessions and non-premium sessions. That is, each NF 500 allows for heterogeneous mixing of session with premium retainability and session with non-premium retainability.

Assuming active NF 500-1 has a chassis failure (indicated by the "X" in FIG. 5), a failover to standby NF 500-2 may occur. If failover occurs, all non-premium users (e.g., with sessions going through non-premium segment 520-1) would need to reestablish their PDU sessions, while the premium users' sessions (e.g., sessions going through premium segment 510-1) would continue with no or minimal interruption.

Figure 6:
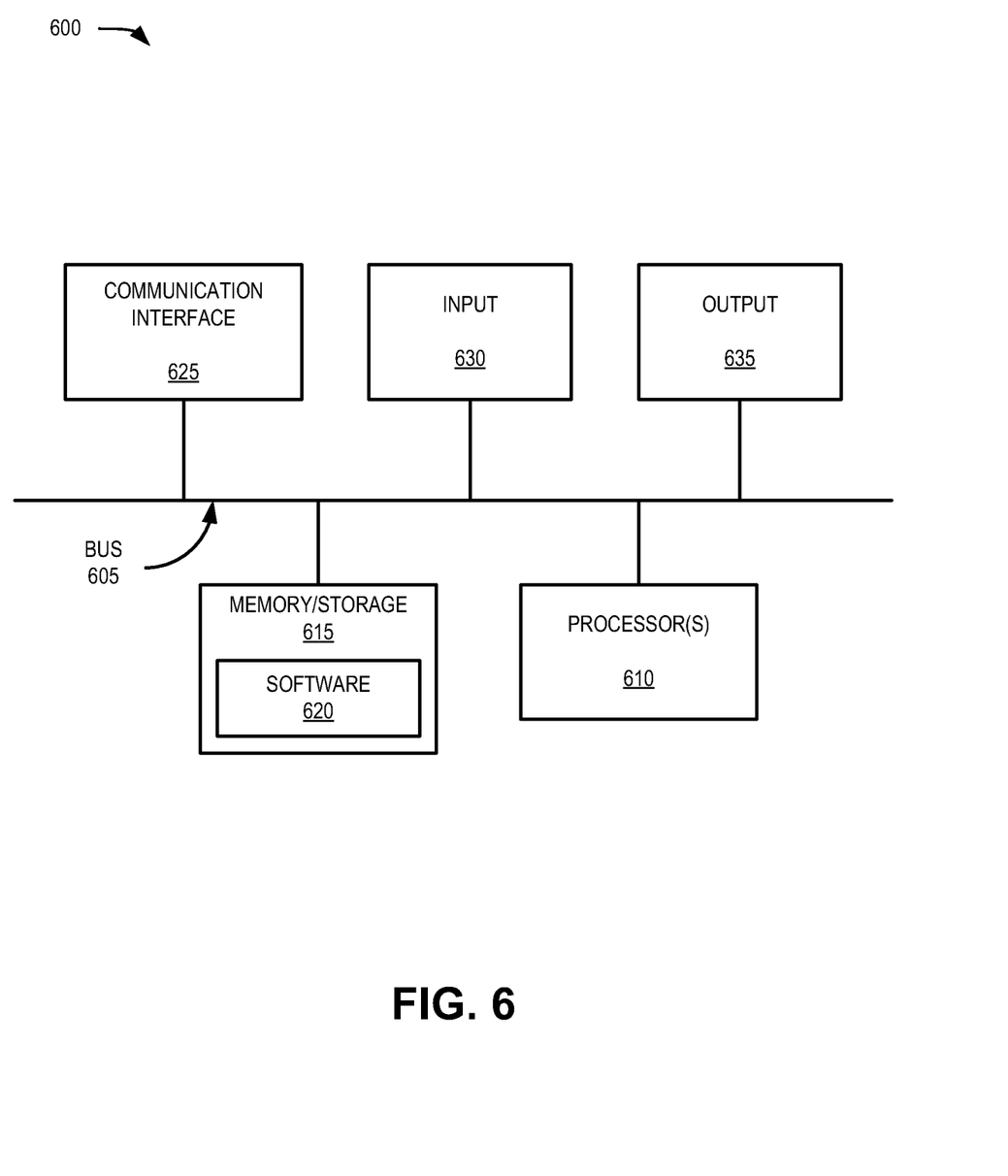
FIG. 6 is a diagram illustrating example components of a device that may correspond to one or more of the devices illustrated and described herein.

FIG. 6 is a diagram illustrating example components of a device 100 that may be included in one or more of the devices described herein. For example, device 600 may correspond to SMF 205, a PCF 210, UDR 220, UDM 225, provisioning system 230, NFVO 235, PGW 305, PCRF 310, MME 315, HSS 320, SGW 325, UE device 110, network device 135, and/or other types of network elements, as described herein. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. Processor 610 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation, or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.).

Memory/storage 615 includes one or multiple memories and/or one or multiple other types of storage mediums. Memory/storage 615 may store data, software, and/or instructions related to the operation of device 600. Software 620 includes an application or a program that provides a function and/or a process. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service-based interface, or a reference interface, for example. Input 630 permits an input into device 600. Output 635 permits an output from device 600.

As previously described, a network device may be implemented according to various computing architectures (e.g., in a cloud, etc.) and according to various network architectures (e.g., a virtualized function, etc.). Device 600 may be implemented in the same manner. For example, device 600 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., data network 140) and/or another type of network (e.g., access network 120, core network 130, etc.). Thus, network functions described herein may be implemented as device 600.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 may cause processor 610 to perform a function or a process described herein. Alternatively, for example, according to other implementations, device 600 performs a function or a process described herein based on the execution of hardware (processor 610, etc.).

Figure 7:
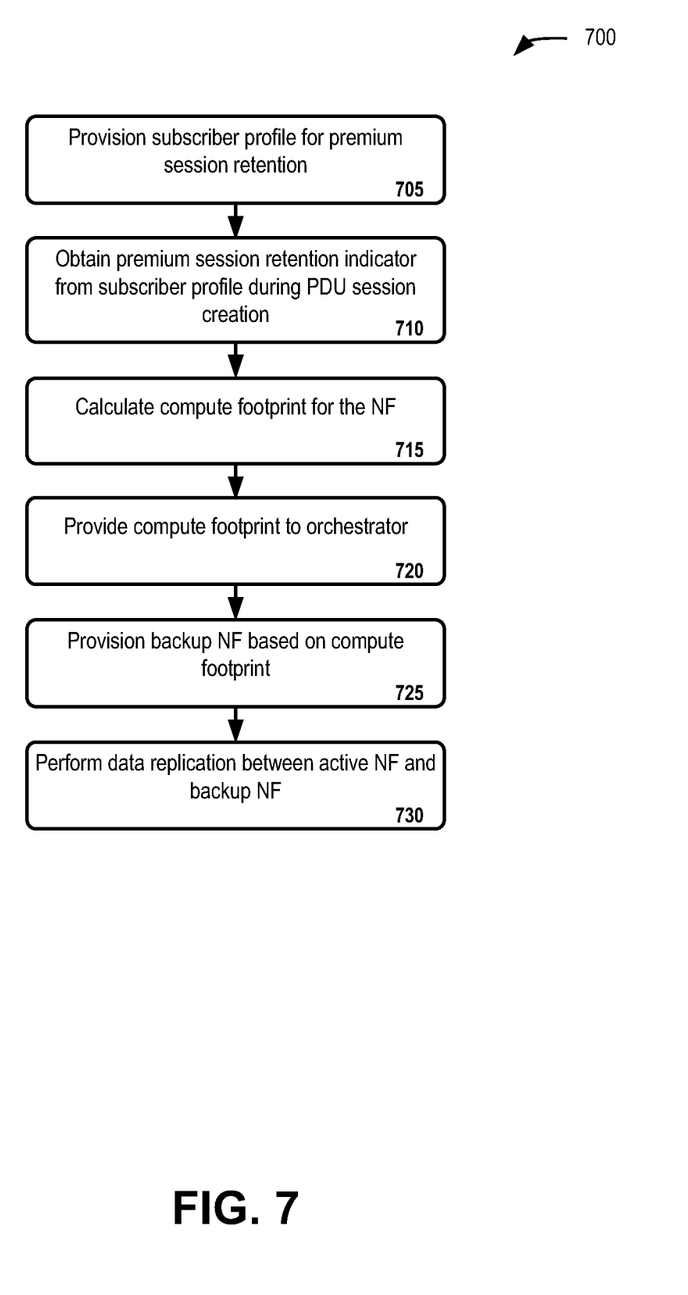
FIG. 7 is a flow diagram illustrating an example process for configuring network functions to support premium session retention, according to an implementation described herein.

FIG. 7 is a flow diagram illustrating an example process 700 for configuring network functions to support premium session retention, according to an implementation described herein. In one implementation, process 700 may be implemented by one or more components of core network 130. In another implementation, process 700 may be implemented by components of core network 130 in conjunction with one or more other devices in network environment 100.

Process 700 may include provisioning a subscriber profile for premium session retention (block 705) and obtaining a premium session retention indicator from the subscriber profile during a PDU session creation (block 710). For example, based on a user's purchase/election of a premium session retainability service, provisioning system 230 may provision a subscriber's profile in UDR 220 and/or HSS 320 with a premium session retention indicator, such as a PremRetFlag. When a UE device (e.g., UE device 110) associated with the subscriber initiates a PDU session, the PremRetFlag may be provided with other exchanges for the session establishment procedure. For example, the PremRetFlag may be provided to SMF 205 (e.g., from UDM 225 via a modified N10 interface), to PCF 210 (e.g., from SMF 205 via a modified N7 interface), to PGW 305 (e.g., from SGW 325 via a modified S5/S8 interface), or to PCRF 310 (e.g., via a modified Gx interface), among other NFs.

Process 700 may also include calculating a compute footprint for the NF (block 715) and providing the compute footprint to an orchestrator (block 720). For example, SMF 205, PCF 210, PGW 305, PCRF 310 or another NF that receives the PremRetFlag may calculate a compute footprint for supporting the new premium session and any other premium sessions (e.g., sessions designated for premium session retention) currently serviced by that network function. SMF 205, PCF 210, PGW 305, PCRF 310 or the other NF may send the compute footprint to NFVO 235.

Process 700 may further include provisioning a backup NF based on the compute footprint (block 725) and performing data replication between the active NF and the backup NF (block 730). For example, NFVO 235 may use the compute footprint to identify a minimum amount of compute resources required to provide inter-chassis redundancy for SMF 205, PCF 210, PGW 305, PCRF 310 or the other primary NF. NFVO 235 may provision secondary or standby NFs for the corresponding primary NF. The allocation for the secondary NFs may be larger than the minimum to ensure adequate redundancy. Once established, the primary and corresponding secondary NFs may perform data replication for their current PDU sessions to maintain updated state/context data for each session. The state/context data may be available to support failover operations that enable premium users' sessions continue with no or minimal interruption.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 7, and message/operation/deployment flows with respect to FIGS. 4A and 4B, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
obtaining, by a first network function of a core network, a session retention indicator for a protocol data unit (PDU) session;
calculating, by the first network function, a compute footprint for the first network function to support the PDU session and any other premium sessions currently serviced by the first network function;
forwarding, to an orchestration device, the compute footprint;
provisioning, by the orchestration device, a second network function based on the compute footprint; and
performing replication, of session state data for the PDU session, between the first network function and the second network function.

2. The method of claim 1, wherein the session retention indicator is included within a subscriber profile, and wherein the obtaining is performed as part of a PDU session establishment procedure.

3. The method of claim 1, wherein the compute footprint indicates resources needed to survive a failure for all premium sessions, including the PDU session, currently serviced by the first network function.

4. The method of claim 1, wherein the first network function and the second network function have geo-redundancy.

5. The method of claim 1, wherein the first network function includes:
a Policy Control Function (PCF),
a Session Management Function (SMF), or
a Charging Function (CHF).

6. The method of claim 1, wherein the first network function includes:
a Packet data network Gateway (PGW), or
a Policy Charging and Rules Function (PCRF).

7. The method of claim 1, wherein obtaining the session retention indicator includes:
retrieving the session retention indicator from a Unified Data Repository (UDR), or
receiving the session retention indicator from a Unified Data Management (UDM) function.

8. The method of claim 1, further comprising:
sending, by the first network function and to a third network function, the session retention indicator.

9. The method of claim 1, wherein the first network function or the second network function service a combination of premium sessions and non-premium sessions.

10. A system comprising:
a first processor for a first network function configured to:
obtain, in a core network, a session retention indicator for a protocol data unit (PDU) session,
calculate a compute footprint for the first network function to support the PDU session and any other premium sessions currently serviced by the first network function, and
forward, to an orchestration device, the compute footprint; and
a second processor for an orchestration function that is configured to provision a second network function based on the compute footprint; and
a third processor for the second network function that is configured to perform replication of session state data between the first network function and the second network function for the PDU session.

11. The system of claim 10, wherein the session retention indicator is included within a subscriber profile, and wherein the obtaining is performed as part of a PDU session establishment procedure.

12. The system of claim 10, wherein the compute footprint indicates resources needed to survive a failure for all premium sessions, including the PDU session, currently serviced by the first network function.

13. The system of claim 10, wherein the first network function and the second network function have geo-redundancy.

14. The system of claim 10, wherein the first network function includes:
a Policy Control Function (PCF),
a Session Management Function (SMF),
a Charging Function (CHF),
a Packet data network Gateway (PGW), or
a Policy Charging and Rules Function (PCRF).

15. The system of claim 10, wherein the first network function is further configured to:
send, to a third network function, the session retention indicator.

16. The system of claim 10, wherein the first network function or the second network function service a combination of premium sessions and non-premium sessions.

17. A non-transitory computer-readable medium containing instructions executable by at least one processor in a core network, the computer-readable medium comprising one or more instructions for:
obtaining a premium session retention indicator for a protocol data unit (PDU) session;
calculating a compute footprint for a first network function to support the PDU session and any other premium sessions currently serviced by the first network function;
provisioning a second network function based on the compute footprint; and
performing replication, of session state data for the PDU session, between the first network function and the second network function.

18. The non-transitory computer-readable medium of claim 17, wherein the session retention indicator is included within a subscriber profile, and wherein the obtaining is performed as part of a PDU session establishment procedure.

19. The non-transitory computer-readable medium of claim 17, wherein the compute footprint indicates resources needed to survive a failure for all premium sessions, including the PDU session, currently serviced by the first network function.

20. The non-transitory computer-readable medium of claim 19, wherein the first network function or the second network function service a combination of premium sessions and non-premium sessions.

* * * * *